United States Patent
Nakagawa et al.

(10) Patent No.: US 7,412,391 B2
(45) Date of Patent: Aug. 12, 2008

(54) USER INTERFACE DESIGN APPARATUS AND METHOD

(75) Inventors: Kenichiro Nakagawa, Kawasaki (JP);
Makoto Hirota, Shibuya-ku (JP);
Hiroki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 522 days.

(21) Appl. No.: 11/286,023

(22) Filed: Nov. 22, 2005

(65) Prior Publication Data
US 2006/0116863 A1 Jun. 1, 2006

(30) Foreign Application Priority Data
Nov. 26, 2004 (JP) .............................. 2004-342898

(51) Int. Cl.
*G06F 3/16* (2006.01)
*G06F 17/27* (2006.01)
*G10L 11/00* (2006.01)

(52) U.S. Cl. .......................... 704/270; 704/9; 715/728

(58) Field of Classification Search ................ None
See application file for complete search history.

(56) References Cited

U.S. PATENT DOCUMENTS

| 6,526,382 B1* | 2/2003 | Yuschik ...................... 704/275 |
| 7,149,694 B1* | 12/2006 | Harb et al. ................ 704/270.1 |
| 2004/0083092 A1* | 4/2004 | Valles ........................... 704/9 |
| 2004/0199375 A1* | 10/2004 | Ehsani et al. .................. 704/4 |
| 2004/0220893 A1* | 11/2004 | Spivack et al. ................ 706/46 |
| 2005/0071171 A1* | 3/2005 | Dvorak ....................... 704/275 |
| 2006/0074631 A1* | 4/2006 | Wang et al. ..................... 704/9 |

FOREIGN PATENT DOCUMENTS

| JP | 9-114623 | 5/1997 |
| JP | 3279684 | 2/2002 |

OTHER PUBLICATIONS

Voice Extensible Markup Language (VoiceXML) Version 2.0; W3C Recommendation; Mar. 16, 2004; http://www.w3org/TR/2004/REC-voicexm120-20040316/.
SALT; Speech Application Language Tags (SALT) 1.0 Specification; Jul. 15, 2002; (http://www.w3.org/TR/xhtml+voice/).
XHTML+Voice Profile 1.0; W3C Note Dec. 21, 2001; http:/www.w3.org/TR/xhtml+voice-20011221.
Speech Recognition Grammar Specification Version 1.0; W3C Recommendation Mar. 16, 2004; http://www.w3,org/TR/2003/PR-speech-gtrammar-20031218/.

(Continued)

*Primary Examiner*—David R. Hudspeth
*Assistant Examiner*—Brian L Albertalli
(74) *Attorney, Agent, or Firm*—Morgan & Finnegan LLP

(57) ABSTRACT

A user interface design apparatus which reduces the load associated with input operation by an author is provided. When a speech recognition grammar including a semantic structure generating rule is acquired, at least one semantic structure is extracted from the semantic structure generating rule included in the grammar. This semantic structure is presented to the author. The author can select the semantic structural element presented using an input device. Upon selection by the author is completed, the selected information is extracted and is reflected in user interface contents.

13 Claims, 24 Drawing Sheets

OTHER PUBLICATIONS

Semantic Interpretation for Speech Recognition (SISR) Version 1.0; W3C Candidate Recommendaqtion Jan. 11, 2006; http://w3.org/TR/2006/CR-semantic-interpretation-20060111/.

Voice Extensible Markup Language (VoiceXML) Version 2.0; W3C Recommendation; Mar. 16, 2004; http://www.w3org/TR/2004/REC-voicexml20-20040316/.

SALT; Speech Application Language Tags (SALT) 1.0 Specification; Jul. 15, 2002; (http://www.saltforum.org/TR/xhtml+voice/).

XHTML+Voice Profile 1.0; W3C Note Dec. 21, 2001; http:/www.w3.org/TR/xhtml+voice-20011221.

Speech Recognition Grammar Specification Version 1.0; W3C Recommendation Mar. 16, 2004; http://www.w3,org/TR/2003/PR-speech-gtrammar-20031218/.

Semantic Interpretation for Speech Recognition (SISR) Version 1.0; W3C Candidate Recommendaqtion Jan. 11, 2006; http://w3.org/TR/2006/CR-semantic-interpretation-20060111/.

* cited by examiner

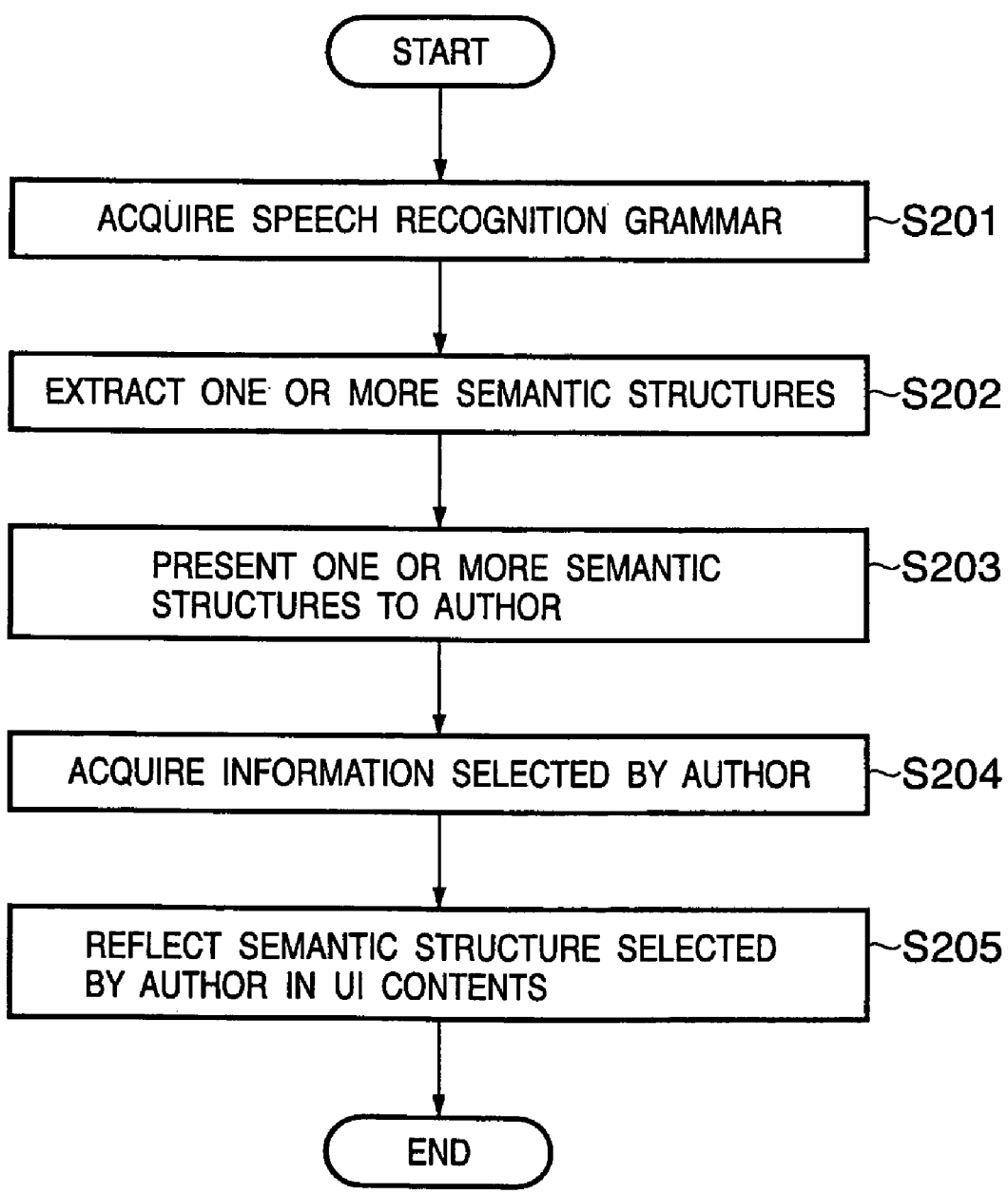

FIG. 3

```
                                    301
                                   /
<rule id="order">
  I would like a
  <ruleref uri="#drink"/>
  <tag>$.drink=new Object(); $.drink. liquid=$drink. type; $.
  drink. drinksize=$drink. drinksize</tag>
  and
  <ruleref uri="#pizza"/>
  <tag>$.pizza=$pizza</tag>
</rule>
                                        302
<rule id="kindofdrink">
  <one-of>
    <item>coke</item>
    <item>pepsi</item>
    <item tag="coke">coca cola</item>
    <!--quote for string constant-->

</one-of>
</rule>

<rule id="foodsize">
  <tag>$= 'medium'</tag><!--no more need for NULL-->
  <item repeat="0-1">
    <one of>
      <item>small</item>
      <item>medium</item>
      <item>large</item>
      <item tag= 'medium'>regular</item>
    </one-of>
  </item>
</rule>

<rule id="tops">
  <tag>$=new Array;</tag>
  <ruleref uri="#top"/>

<tag>$.push($top)</tag>
  <item repeat="1-">
    and
    <ruleref uri="#top"/>

<tag>$.push($top);/tag>
  </item>
</rule>
```

FIG. 4

```
<rule id="top">
  <one-of>
    <item>anchovies</item>
    <item>pepperoni</item>
    <item tag='mushrooms'>mushroom</item>
    <item>mushrooms</item>
  </one-of>
</rule>

<rule id="drink">
  <ruleref uri="#foodsize"/>
  <ruleref uri="#kindofdrink"/>
  <tag>$.drinksize=$foodsize; $.type=$kindofdrink</tag>
</rule>

<rule id="pizza">
  <ruleref uri="#number"/>
  <ruleref uri="#foodsize"/>
  <tag>$.pizzasize=$foodsize; $.number=$number</tag>
  pizzas with
  <ruleref uri="#tops"/>
  <tag>$.topping=$tops</tag>
</rule>

<rule id="number">
  <one of>
    <item tag="1">

<one of>
        <item>a</item>
        <item>one</item>
      </one-of>
    </item>
    <item tag="2">two</item>
    <item tag="3">three</item>
  </one-of>
</rule>
```

FIG. 5

```
            501
           /
        {
          drink: {
            liquid:"coke"
            drinksize:"medium"         502
          }                           /
          pizza: {
            number:"3"
            pizzasize:"large"
            topping:["pepperoni","mushrooms"]
          }
        }
```

| pizza order | □ ☒ |

Drink
- name: coke
- size: medium

Pizza
- number: 3
- size: large
- topping: pepperoni, mushrooms

[ speech ] [ order ] [ cancel ]

FIG. 11

```
00  Generate(InputRule)
01  {
02      list=" ";
03      EXPAND RIGHT HAND SIDE OF Token=InputRule
04      for(i=0;i<NumberOfToken;i++){
05          if(Token[i] is RuleReference){
06              list+=Generate(Token[i]);
07          }
08          elseif(Token[i] is AlternativeElement){
09              list+=Select(Token[i]);
10          }
11          else{
12              list+=Token[i];
13          }
14      }
15      return(list);
16  }
17
18
19  Select(AlternativeElem)
20  {
21      lis=" ";
22      select one Item from Item=AlternativeElem
23      if(Item is RuleReference){
24          list+=Generate(Item);
25      }
26      elseif(Elem is alternative element){
27          list+=Select(Item);
28      }
29      else{
30          list+=Item;
31      }
32      return(list);
33  }
```

F I G. 12B
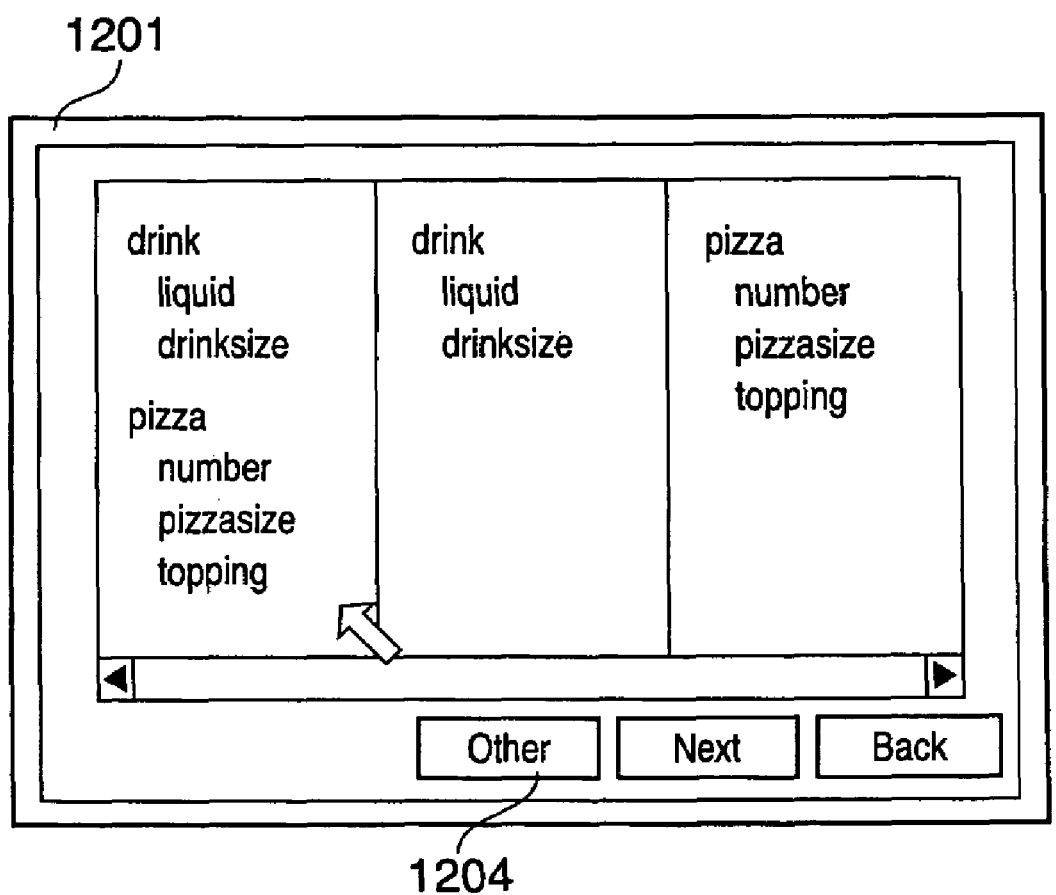

```
<rule id="order">
  <example>
    I would like a coca cola and three large pizzas with pepperoni and mushrooms
  </example>
  I would like a
  <ruleref uri="#drink"/>
  <tag>$.drink=new Object(); $.drink. liquid=$drink. type; $. drink. drinksize=$drink. drinksize</tag>
  and
  <ruleref uri="#pizza"/>
  <tag>$.pizza=$pizza</tag>
</rule>
    ⋮
```

FIG. 14

```
<!--
{
  drink: {
    liquid
    drinksize
  }
  pizza: {
    number
    pizzasize
    topping
  }
}
-->

<rule id="order">
    I would like a
    <ruleref uri="#drink"/>
    <tag>$.drink=new Object(); $.drink. liquid=$drink. type;
$.drink. drinksize=$drink. drinksize</tag>
    and
    <ruleref uri="#pizza"/>
    <tag>$.pizza=$pizza</tag>
</rule>
        ⋮
```

1401 points to the comment block at the top.

USER INTERFACE DESIGN APPARATUS AND METHOD

FIELD OF THE INVENTION

The present invention relates to a user interface design apparatus and method for designing a user interface for an application for providing a pattern recognition function.

BACKGROUND OF THE INVENTION

Currently, the following are available as markup language specifications for describing a speech user interface (to be referred to as a "speech UI" hereinafter):
(1) VoiceXML (see http://www.w3.org/TR/voicexml20/)
(2) SALT (see http://www.saltforum.org/)
(3) XHTML+Voice (see http://www.w3.org/TR/xhtml+voice/)

Letting a browser read in contents written in accordance with such specification makes it possible to implement a speech UI between a user and a device (or service).

In general, an author (content creator) creates these speech UI contents by using a dedicated authoring tool (see e.g., Japanese Patent No. 3279684 and Japanese Patent Laid-Open No. 09-114623).

In order to implement a speech UI, a speech recognition technique for recognizing speech is required. Speech recognition is a process for selecting one of word sequences satisfying designated language constraints, which is nearest to the utterance, by using the acoustic statistic of human speech called an acoustic model. The language constraints are also called a speech recognition grammar.

As a general speech recognition grammar for the recognition of "Yes" or "No", an existing grammar can be used. However, the author needs to create grammars specialized for other applications. For such speech recognition grammars, W3C is working for standardization, which is now recommended as "Speech Recognition Grammar Specification Version 1.0" (to be referred to as "SRGS" hereinafter). The specifications according to SRGS are disclosed in http://www.w3.org/TR/speech-grammar/. FIGS. 3 and 4 show an example of the description of a speech recognition grammar described by SRGS.

With regard to the specification "Semantic Interpretation for Speech Recognition" (to be referred to as "SISR" hereinafter) as well, standardization is now being promoted. This is a specification for specifying the semantic structure of a speech recognition result. Using this specification makes it possible to extract semantic information contained in a corresponding utterance as a speech recognition result. Referring to FIG. 3, reference numeral 302 denotes an example of an SISR semantic structure generating rule. As in this case, the semantic structure generating rule is described between <tag> and </tag>°in SRGS or in "tag" attribute. Note that the SISR specification is disclosed in http//www.w3.org/TR/semantic-interpretation/.

Consider, for example, a case wherein the utterance "I would like a coca cola and three large pizzas with pepperoni and mushrooms." is made in speech recognition processing using the speech recognition grammar shown in FIGS. 3 and 4. As a result, structure data like that shown in FIG. 5 is generated. In this specification, a data structure (501) according to a user input is called a "semantic structure", and each data (502) constituting the semantic structure is called a "semantic structural element". In general, an application which receives a recognition result can use such a semantic structure more easily than the character string "I would like a coca cola and three large pizzas with pepperoni and mushrooms." received as a recognition result.

FIG. 6A shows an example of a speech recognition application window before data input. This application is designed to order pizzas by speech or GUI input. A user may fill each form by GUI input or may make the utterance "I would like a coca cola and three large pizzas with pepperoni and mushrooms." after clicking a speech input button 602. When the above utterance is made, each form is automatically filled with data, as shown in FIG. 6B.

Such a speech UI is generally created by using an UI authoring tool. FIG. 7 shows an example of a UI authoring tool window. In many general UI authoring tools, for example, a form palette 702 and a GUI window 703 under edition are seen. An application author creates a GUI window by dragging & dropping desired form controls from a form palette onto a UI window.

After the utterance is made by the user, in order to update the value of each form control as indicated by a window 603 in FIG. 6B in accordance with the user's utterance, the application author needs to perform the operation of binding each form to a semantic structural element of a speech recognition result. For example, the application author must bind the data 502 (the number of pizzas) in the semantic structure of the speech recognition result to a form 704 in which the number of pizzas is stored. When each form or object is to be bound to a semantic structural element of a speech recognition result in this manner, the simplest implementation is a UI like that shown in FIG. 8. That is, a semantic structure bind dialog 801 is presented to the author to make him/her input, by text input, a speech recognition grammar name (802) and a path (803) to a specific structural element generated by speech recognition. In this case, a path to such a semantic structural element is called a "semantic structural path". "/" written in the semantic structural path represents a parent-child relationship. Therefore, "/pizza/number" represents "number" element of the child of "pizza" element, i.e., the data 502.

As shown in FIG. 8, letting the author input a semantic structural path of a speech recognition result by text input makes it possible to set binding of each form control (or object) and a semantic structural element of a speech recognition result.

Such text input imposes a load on the author. It is therefore required to reduce such load on the author.

SUMMARY OF THE INVENTION

In one aspect of the present invention, a user interface design apparatus for generating a user interface content of an application which provides a pattern recognition function, includes: acquiring means for acquiring a recognition grammar in which a semantic structure generating rule for generating a semantic structure of the pattern recognition result is described; extraction means for extracting at least one semantic structure from the semantic structure generating rule described in the recognition grammar acquired by said acquiring means; display means for displaying the at least one semantic structure extracted by said extraction means; and selection means for selecting a semantic structure from the semantic structures displayed by said display means.

The above and other objects and features of the present invention will appear more fully hereinafter from a consideration of the following description taken in connection with the accompanying drawing wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a flowchart showing UI design processing in the semantic structure designating mode of the UI design apparatus according to this embodiment of the present invention;

FIGS. 3 and 4 are views each showing a description example of a speech recognition grammar;

FIG. 5 is a view showing an example of a semantic structure which can be generated from the speech recognition grammar;

FIG. 6B is a view showing a window example (after data input) of the general speech UI application;

FIG. 11 is a view showing an example of an utterance example generating algorithm according to alternative embodiment 1;

FIG. 12B is a view showing an example of a semantic structure rough sketch selecting dialog in alternative embodiment 1;

FIG. 13 is a view showing an example of a speech recognition grammar containing utterance example information in alternative embodiment 2;

FIG. 14 is a view showing an example of a speech recognition grammar containing semantic structure information which can be generated in alternative embodiment 2;

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

Figure 1A:
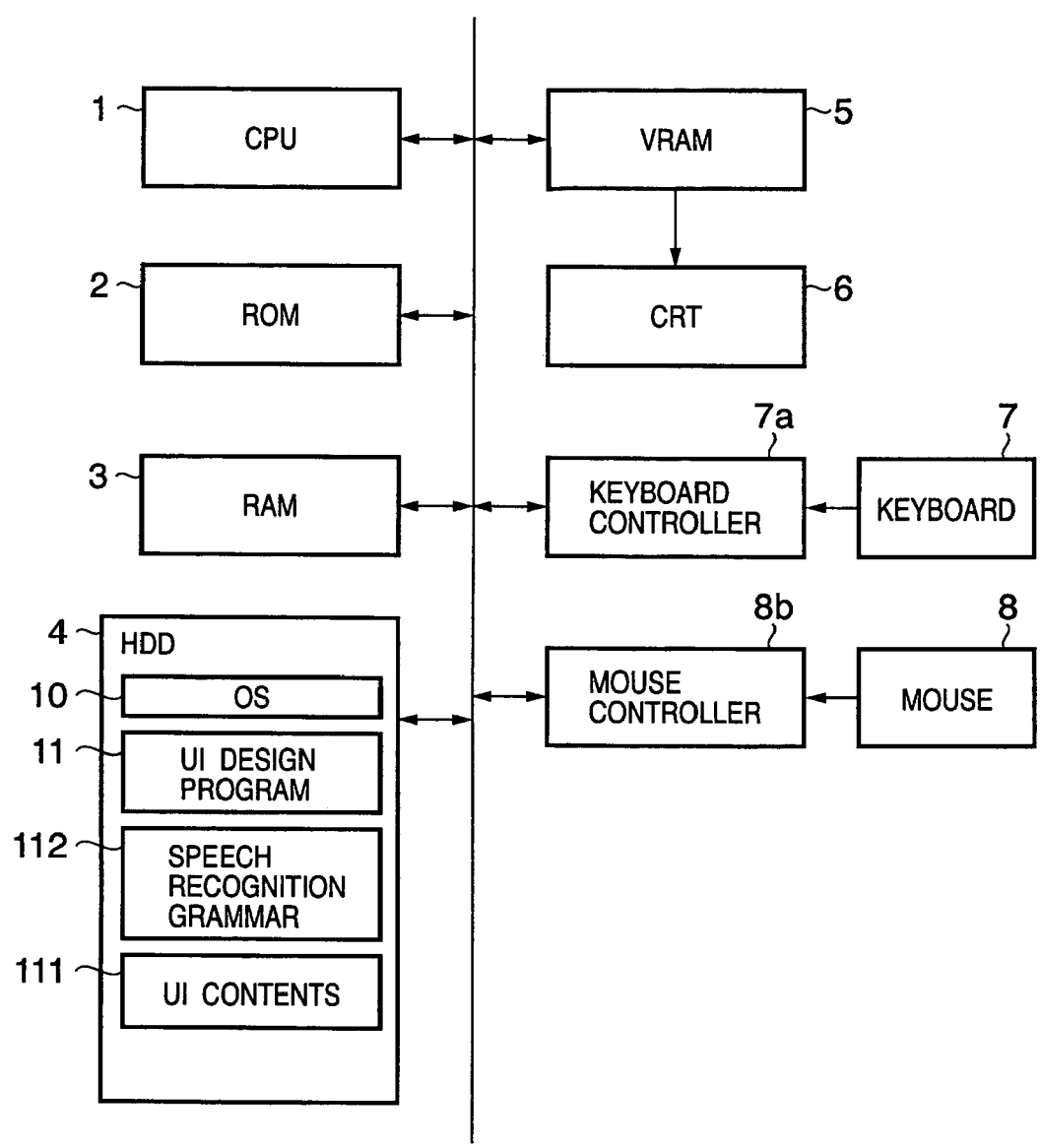
FIG. 1A is a block diagram showing an example of the hardware arrangement of a computer system which implements the function of a user interface design apparatus according to the present invention.

FIG. 1A is a block diagram showing an example of the hardware arrangement of a computer system which implements the function of a user interface design apparatus according to the present invention. Note that a "user interface" will also be referred to as a "UI" in the following description.

The computer system shown in FIG. 1A comprises the following components in addition to a CPU 1 which controls the overall apparatus, a ROM 2 which stores a boot program, permanent data, and the like, and a RAM 3 functioning as a main memory.

An HDD 4 is a hard disk drive, in which a UI design program 11, a speech recognition grammar 112, and UI contents 111 formed by executing the UI design program 11 are stored in addition to an OS 10.

In addition, a VRAM 5 is a memory in which image data to be displayed is bitmapped. Bitmapping image data or the like in this memory makes it possible to display an image on a CRT 6 as an example of a window output device. Reference numerals 7 and 8 denote a keyboard and mouse as input devices, respectively, which are connected to a keyboard controller 7a and mouse controller 8b which transfer interrupt signals to the CPU 1.

The UI design program 11 is activated in accordance with a specific instruction event from the keyboard 7 or mouse 8. In this case, the UI design program 11 is loaded into the RAM 3 and executed by the CPU 1. As a consequence, this computer system functions as a UI design apparatus.

Figure 1B:
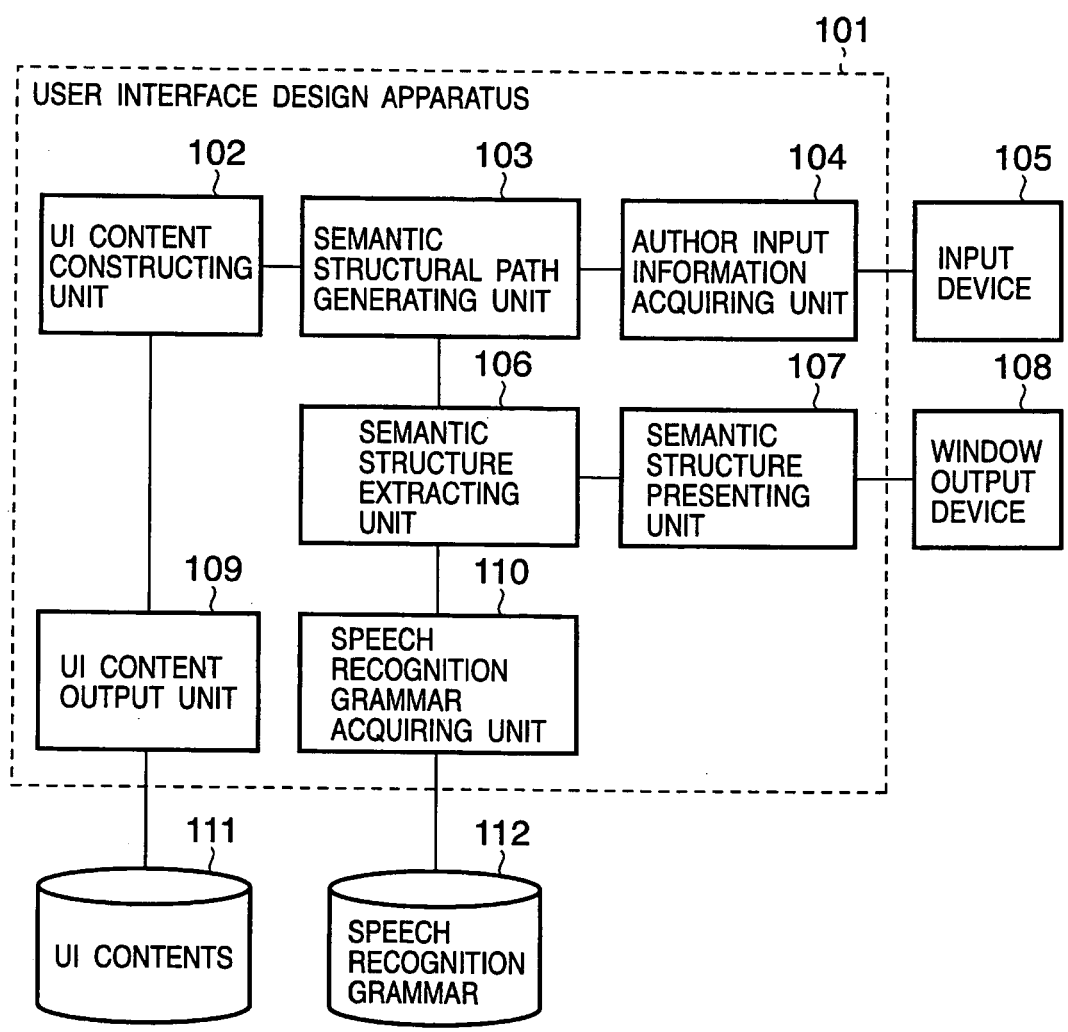
FIG. 1B is a block diagram showing the functional arrangement of the user interface design apparatus according to this embodiment of the present invention.

FIG. 1B is a block diagram showing the functional arrangement of the UI design apparatus according to this embodiment.

A UI design apparatus 101 generates the UI contents 111 desired by the author through an input device 105 including the keyboard 7 and mouse 8 and a window output device 108 formed by the CRT 6.

Figure 6A:
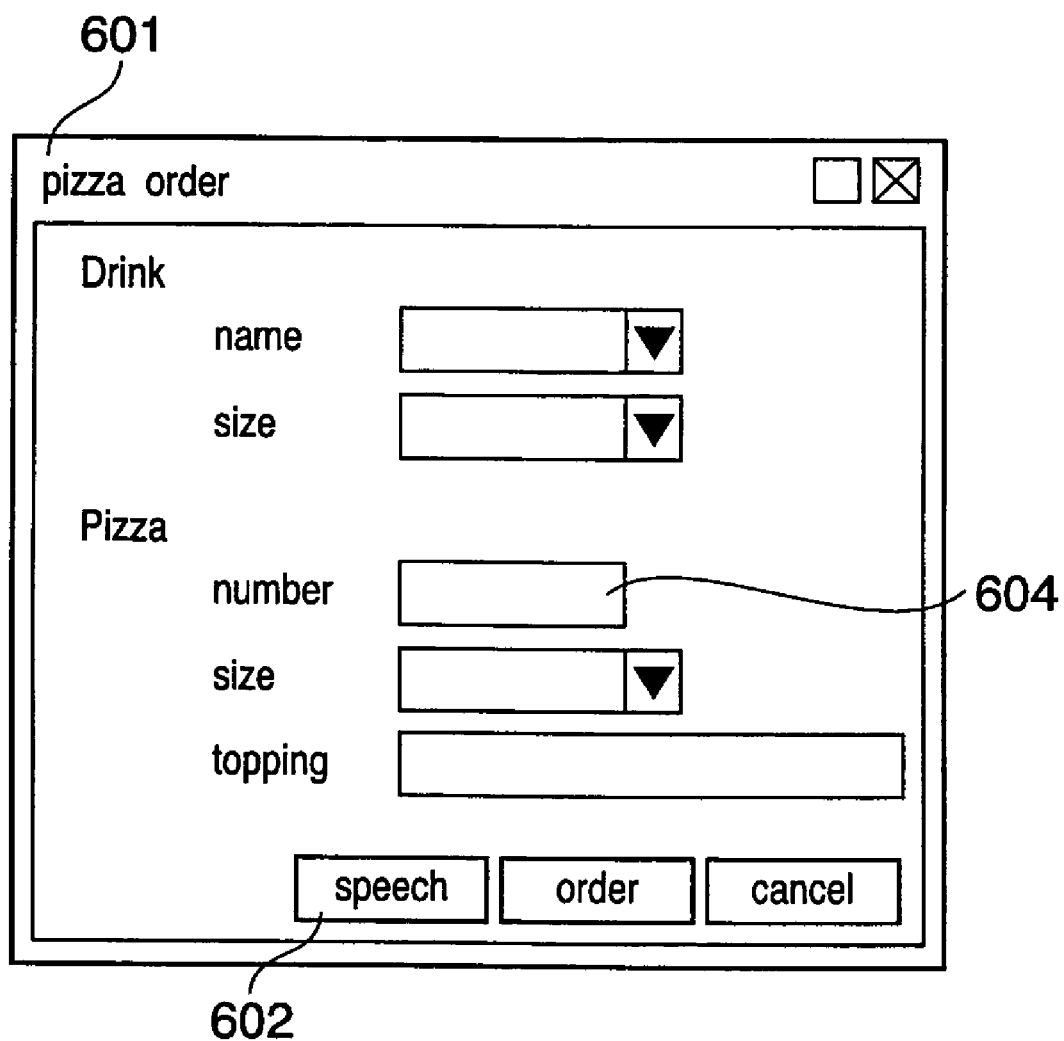
FIG. 6A is a view showing a window example (before data input) of a general speech UI application.

Assume that the UI contents of an application for pizza ordering like those shown in FIG. 6A are to be generated. This UI allows a user to input data with form controls using a GUI. Alternatively, the user can fill each form at once as shown in FIG. 6B by pressing a speech input button 602 and making the utterance "I would like a coca cola and three large pizzas with pepperoni and mushrooms."

Figure 7:
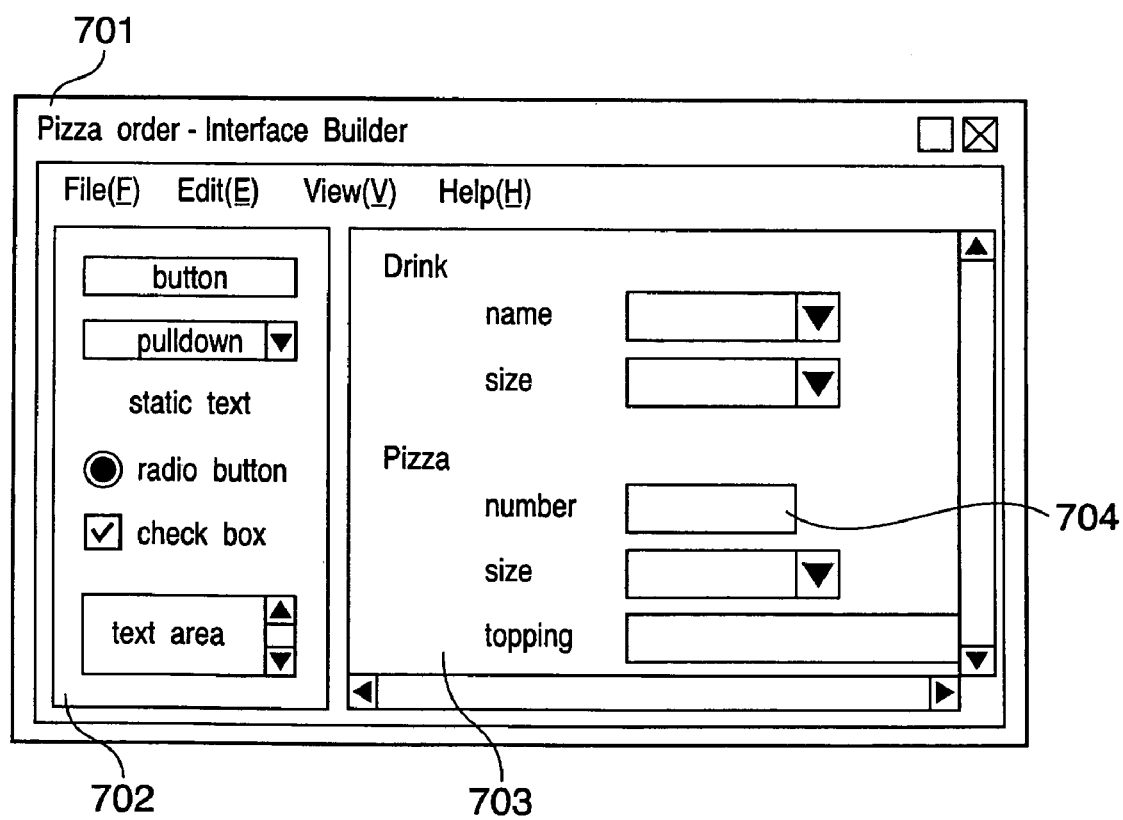
FIG. 7 is a view showing a window example of a general UI authoring tool.

FIG. 7 shows a UI window of this UI design apparatus. This is basically a message-driven application which performs operation in accordance with a command input from the author. When, for example, a file save command or authoring tool end command is input, the application performs corresponding operation.

Consider a case wherein when the number of pizzas is input as a speech recognition result, a UI reflecting the value of a form 1 604 (FIG. 6A) in the value of the speech recognition result is to be created. In this case, the author needs to bind the form controls of the GUI and other objects to the semantic structure of the speech recognition result. The operation of binding to this semantic structure will be referred to as a "semantic structure designating mode". This "semantic structure designating mode" is characteristic operation of this apparatus.

Figure 9A:
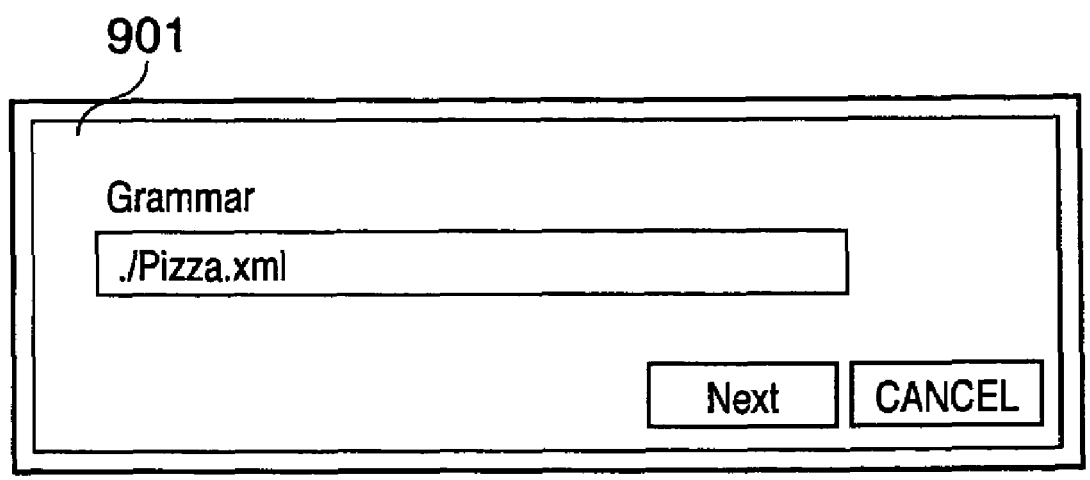
FIG. 9A is a view showing an example of a speech recognition grammar selecting dialog in this embodiment.

The author, for example, right-clicks form 1 (704) in the window shown in FIG. 7 to select "binding to speech recognition result" from a context menu. As a consequence, "semantic structure designating mode" is activated. In "semantic structure designating mode", first of all, a speech recognition grammar selecting dialog 901 in FIG. 9A appears, and the author inputs a desired speech recognition grammar name. If a speech recognition grammar is designated in another window, this dialog display may be omitted.

FIG. 2 is a flowchart showing processing in the semantic structure designating mode of the UI design apparatus according to this embodiment.

When a semantic recognition grammar name is input in the speech recognition grammar selecting dialog 901 in the above manner, a speech recognition grammar acquiring unit 110 (see FIG. 1B) acquires the designated speech recognition grammar 112 (step S201). In this case, the acquired speech recognition grammar will be described as that shown in FIGS. 3 and 4. Assume that in the acquired speech recognition grammar, a semantic structure generating rule 302 for generating the semantic structure of utterance contents is written.

The acquired speech recognition grammar is sent to a semantic structure extracting unit 106. The semantic structure extracting unit 106 analyzes the acquired speech recognition grammar and generates at least one semantic structure from the semantic structure generating rule contained in the grammar (step S202).

For example, the semantic structure extracting unit 106 may search out all properties in the semantic structure generating rule contained in the speech recognition grammar to extract a list of them, and combine them into a semantic structure. A property is an identifier appearing on the left hand side in a semantic structure generating rule. A detailed description of properties in such a semantic structure generating rule is disclosed in http://www.w3.org/TR/semantic-interpretation/.

For reference, the following is the list of all properties in the grammar in FIGS. 3 and 4:

[drink, drinksize, liquid, number, pizza, pizzasize, topping, type]

Figure 9B:
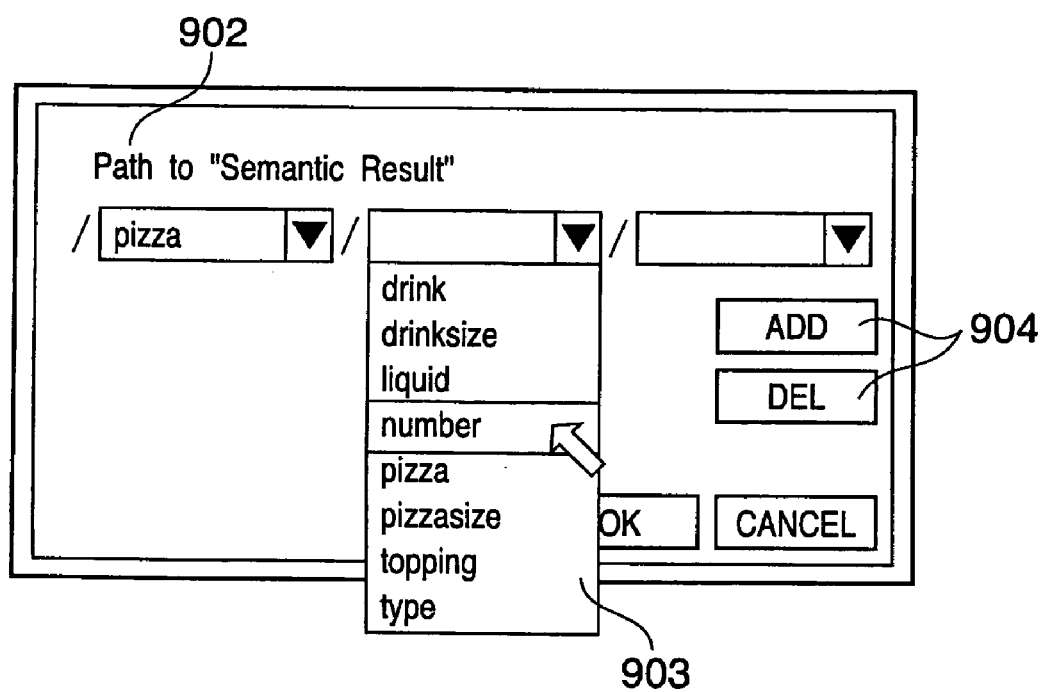
FIG. 9B is a view showing an example of a semantic structural path generating dialog in this embodiment.

The extracted semantic structure is sent to a semantic structure presenting unit 107 and presented to the author through the window output device 108 (step S203). For example, a semantic structural path generating dialog 902 shown in FIG. 9B is displayed as a piece of a semantic structure. The author can designate a specific semantic structural path by operating the input device 105 while seeing the dialog 902. More specifically, the author selects properties from a list box 903 and constructs a desired semantic structural path. Note that the length of a path is increased or decreased by using a path length editing button 904.

When the author completes selection and presses the "OK" button, an author input information acquiring unit 104 acquires the information input by the author (selected information) (step S204). The acquired information is sent to a semantic structural path generating unit 103. In this case, a specific semantic structural path is generated from the respective property names selected by the author and their relationship (step S205). In the above case, the character string "/pizza/number" is generated. The author can generate a semantic structural path by only performing selecting operation from the list box 903 in this manner. At this time, the author need not input any text or the like which specifies a semantic structural element as in the prior art. This reduces the load associated with input operation by the author.

This result is sent to a UI content constructing unit 102 to be reflected in UI contents expressed by a markup language such as VoiceXML, SALT, or XHTML+Voice. The generated UI contents are sent to a UI content output unit 109, from which the contents are output to the external UI content file 111.

Alternative Embodiment 1

In the above embodiment, the properties in a semantic structure generating rule are presented to the author, and the author generates a specific semantic structural path by selecting a combination of properties. According to this method, the author may designate a correct vocabulary forming a path in a wrong order. In the semantic structure in FIG. 5, for example, the semantic structural path "/number/pizza" which cannot be generated from this grammar may be designated. In order to prevent this, utterance information as virtual input information conforming to the speech recognition grammar may be automatically generated from the grammar, and a semantic structure generated when the utterance is input may be presented to the author. A case wherein such processing is introduced will be described below as alternative embodiment 1.

Figure 10:
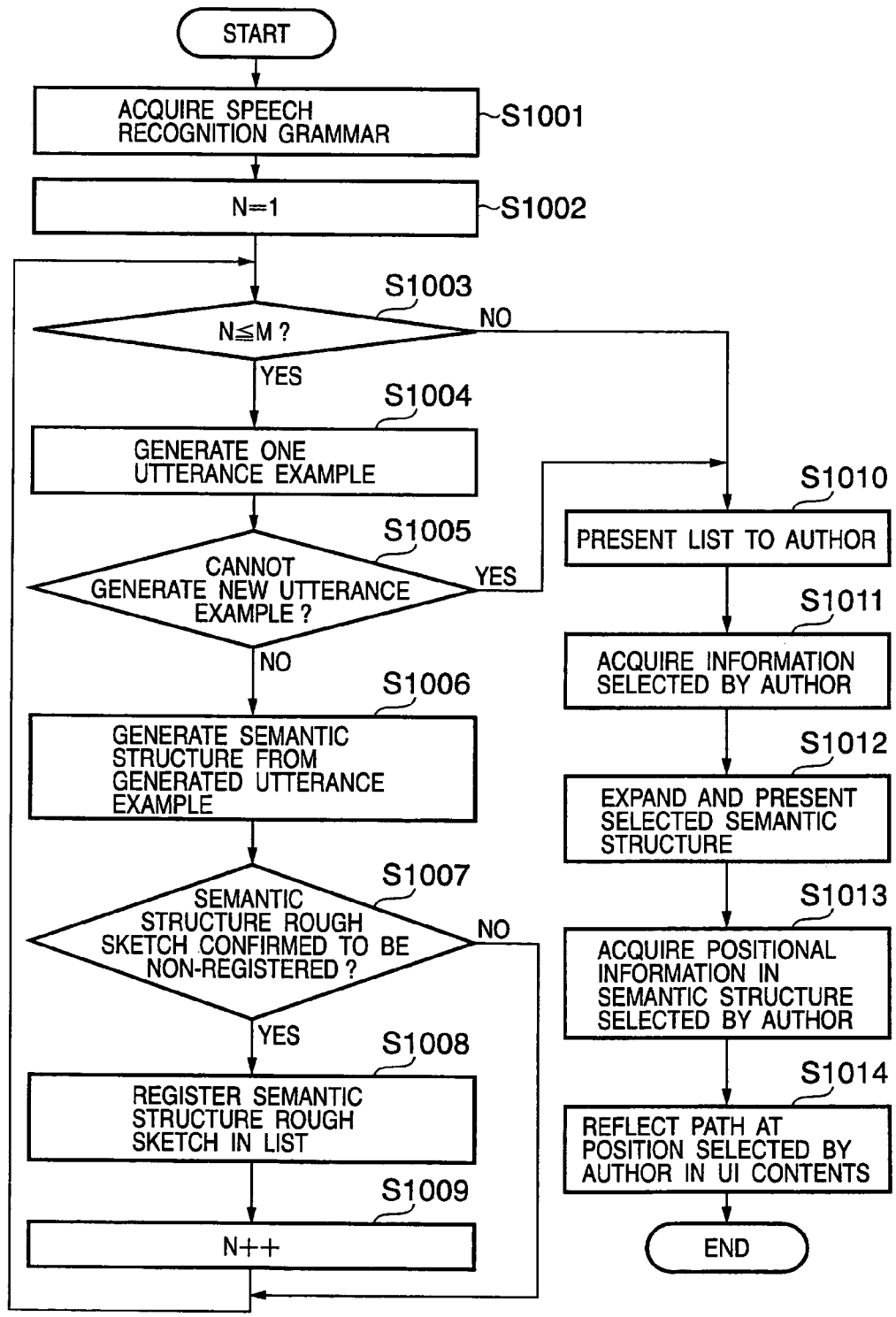
FIG. 10 is a flowchart showing UI design processing according to alternative embodiment 1.

FIG. 10 is a flowchart showing UI design processing according to alternative embodiment 1.

Figure 12A:
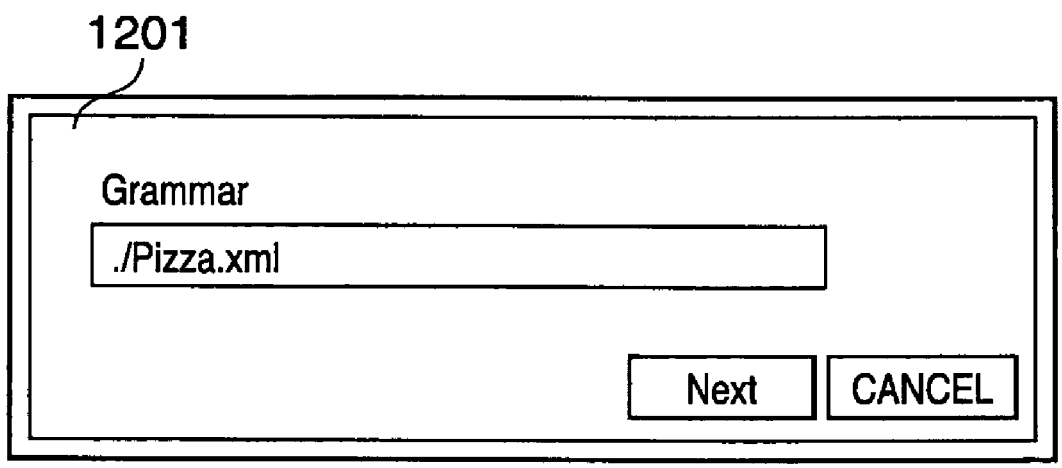
FIG. 12A is a view showing an example of a speech recognition grammar designating dialog in alternative embodiment 1.

When the author right-clicks form 1 (704) in the window in FIG. 7 and selects "binding to speech recognition result" from a context menu, the flow in FIG. 10 starts. When this flow starts, first of all, a speech recognition grammar designating dialog 1201 in FIG. 12A is displayed, in which the speech recognition grammar name input by the author is acquired (step S1001). Note that when a speech recognition grammar has already been designated, this part can be omitted.

An internal variable N is initialized to 1 (step S1002), and one utterance example is generated from the acquired speech recognition grammar (step S1004). For example, an utterance example may be generated from the grammar by using an algorithm like that shown in FIG. 11.

First of all, the routine "Generate" is invoked (00th line) with a route rule name in the grammar as an argument. In the Generate routine, an internal variable list is cleared (02nd line), and the right hand side is expanded from the input rule name. The expanded right hand side is cut out token by token, and the tokens are stored in a Token list (03rd line).

For all the cutout tokens, the following checks are made. First of all, it is checked whether each token is a reference to another rule like <ruleref>. If so, the Generate routine is recursively invoked with the corresponding rule name as an argument. The result is added to the list variable (06th line). It is then checked whether the token is a selection element such as <one-of >. If so, the Select subroutine (to be described later) is invoked with the selection element as an argument. The result is added to the list variable (09th line). If the token is neither a reference to another rule nor a selection element, the token is regarded as a terminal symbol (uttered word), and is added to the list without any change (12th line). These operations are performed for all the cutout tokens, and the list variable is returned at the end (15th line).

In the Select subroutine, first of all, the internal variable list is initialized (21st line). One of the selection items designated by <item> of the input selection elements is selected (22nd line). In this selection scheme, the selection item which appears first may be selected or one of the items designated by <item> may be randomly selected. For the selected selection item, the same checks as those in the Generate routine are performed (23rd to 31st lines). After the checks, the list variable is returned.

By executing such an algorithm, the text information of an utterance example accepted by the speech recognition grammar can be extracted. Note, however, that this algorithm cannot cope with a grammar description designating repetition of utterance. In addition, a grammar description including the recursion of a rule results in an infinite loop. Therefore, in order to cope with these general speech recognition grammars, the above algorithm must be improved.

When the text information of a new utterance example can be generated by these algorithms (NO in step S1005), a semantic structure is generated from the generated utterance example (step S1006). More specifically, syntax analysis of the utterance example text is performed by using the speech recognition grammar. A semantic structure can be generated by executing a semantic information generating rule on the corresponding path. With regard to the generation of a semantic structure, see the description in http://www.w3.org/TR/semantic-interpretation/.

Thereafter, it is checked whether the generated semantic structure is the same as that has already been registered in the list (step S1007). If the semantic structure has not been registered, the structure is registered in the list (step S1008), and the internal variable N is incremented by one (step S1009).

Figure 12C:
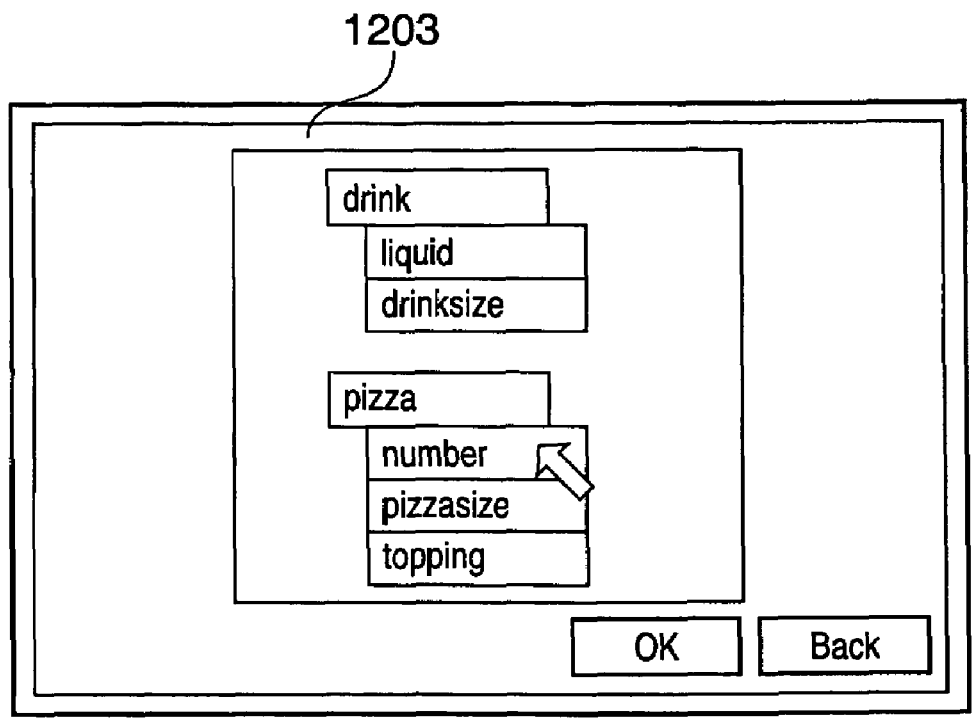
FIG. 12C is a view showing an example of a semantic structural path designating dialog in alternative embodiment 1.

The processing in steps S1004 to S1009 described above is repeated until the number of variables N becomes a predetermined number M (e.g., 3) and a new utterance example is generated from the speech recognition grammar. If these conditions are not satisfied, the flow exits from the loop, and the data in the list is presented to the author in, for example, a semantic structure rough sketch selecting dialog 1202 shown in FIG. 12B (step S1010). In the window shown in FIG. 12B, a maximum of M overviews of semantic structures automatically generated by the speech recognition grammar are displayed. The author can select a semantic structure from these semantic structures. When this selected information is acquired (step S1011), the internal structure of the selected semantic structure is expanded to present a window which allows the author to select a semantic structural element (step S1012). FIG. 12C shows a dialog 1203 displayed at this time. The author can select a semantic structural element by using a mouse or the like. When this selected semantic structural element is acquired (step S1013), a path is generated at the position selected by the author, and is reflected in UI contents (step S1014).

In this example, the maximum number of semantic structures to be presented by the apparatus is limited to M. For this reason, there is a possibility that a semantic structure intended by the author may not be presented. In this case, a button 1204 in FIG. 12B is prepared. When this button is pressed, the currently used path designating method may be switched to another method. For example, the dialog 902 shown in FIG. 9B may be presented.

Alternative Embodiment 2

In alternative embodiment 1, an utterance example is automatically generated by the speech recognition grammar. In this method, however, a semantic structure intended by the author may not be included in M semantic structures presented by the apparatus. In order to solve this problem, M may be increased. If, however, M is increased, the load of searching for a semantic structure intended by the author increases. In alternative embodiment 2, therefore, semantic structures are generated by using the speech recognition grammar and utterance example information written in the grammar and are presented to the author.

FIG. 13 shows an example of a speech recognition grammar written by SRGS. In SRGS, the tag <example> describing an utterance example is prepared, and the example written in this tag can be used as utterance example information. Reference numeral 1301 in FIG. 13 denotes an example of utterance example information.

Since the flow of processing in this case is the same as that shown in FIG. 10, a detailed description thereof will be omitted. Note, however, that the processing in step S1004 differs from that in alternative embodiment 1. In alternative embodiment 1 described above, utterance examples are automatically generated from the speech recognition grammar. In alternative embodiment 2, an utterance example text written in the speech recognition grammar may be used.

In addition, in the speech recognition grammar, semantic structure information which can be generated by the grammar may be written in advance. FIG. 14 shows an example in which semantic structure information which can be generated by the grammar is written in the grammar. The semantic structure information is set in a comment field in SRGS. Using this provides an advantage of eliminating the necessity of the processing of generating a semantic structure (step S1006).

Alternative Embodiment 3

Figure 15:
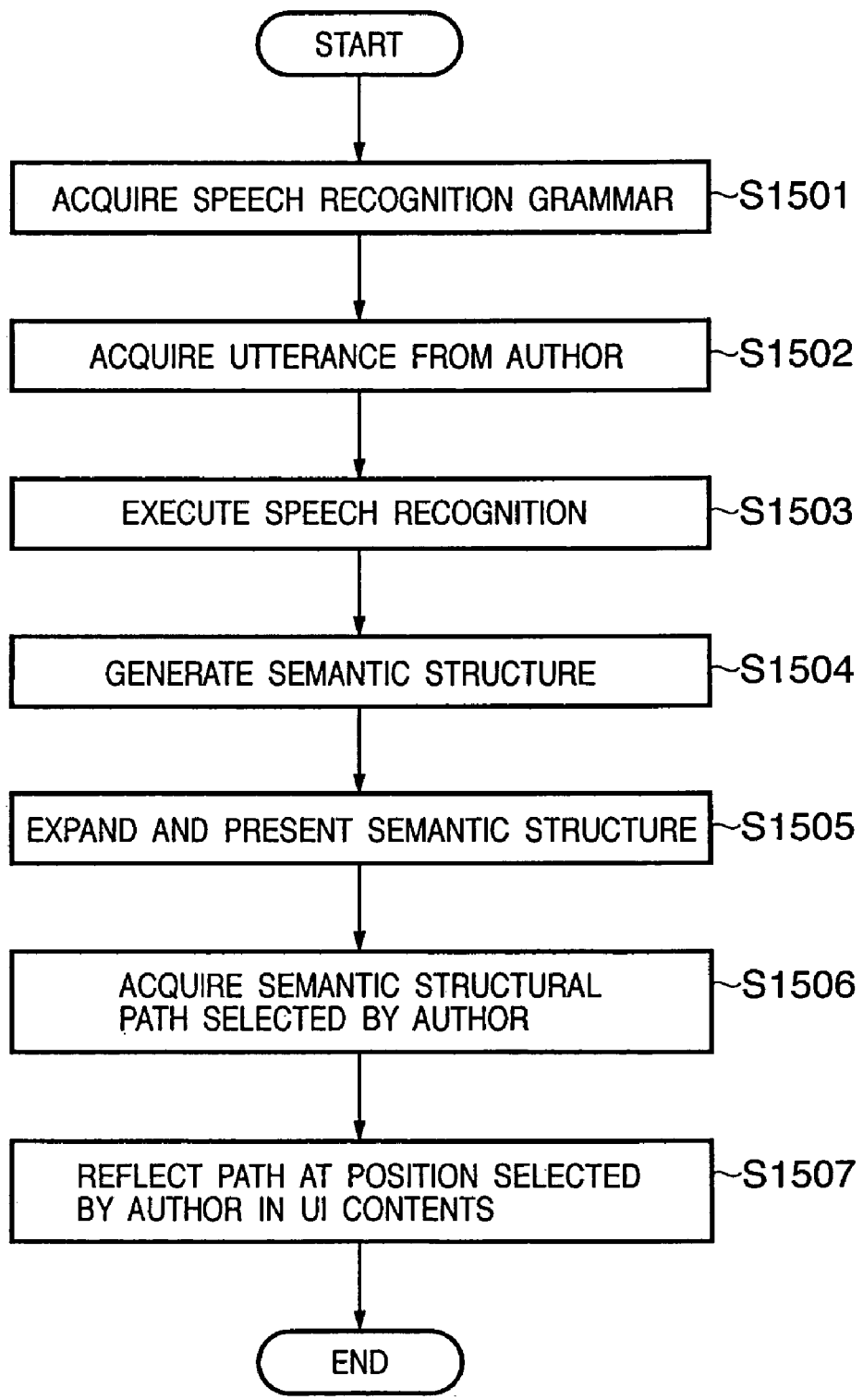
FIG. 15 is a flowchart showing UI design processing according to alternative embodiment 3.

In alternative embodiment 2, an utterance example is input at the time of the generation of a speech recognition grammar. It is, however, effective to input an utterance example at the time of the use of an authoring tool. FIG. 15 shows a flowchart of UI design processing which realizes such processing.

Figure 16A:
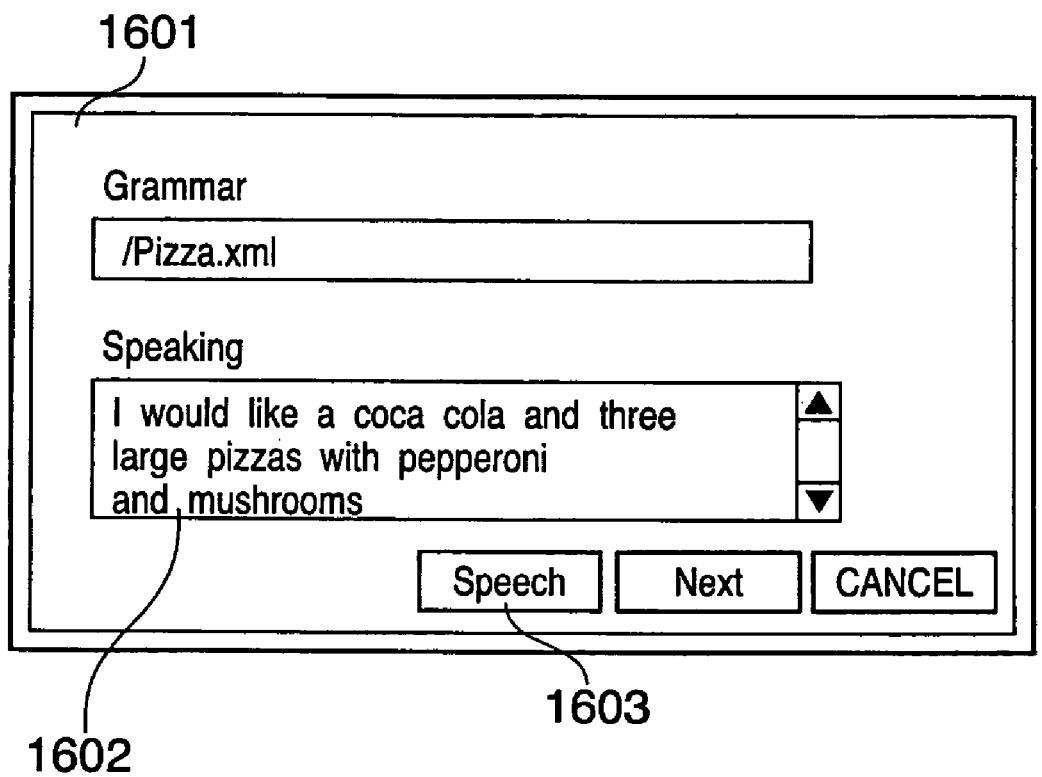
FIG. 16A is a view showing an example of a speech recognition grammar designating dialog in alternative embodiment 3.

When the author right-clicks form 1 (704) in the window in FIG. 7 and selects "binding to speech recognition result" from a context menu, the flow in FIG. 15 starts. When this flow starts, first of all, a speech recognition grammar designating dialog 1601 shown in FIG. 16A is displayed, in which a speech recognition grammar name input by the author is acquired (step S1501). In the speech recognition grammar designating dialog 1601, a speech recognition button 1603 is also prepared. When the speech recognition button 1603 is pressed, an utterance from the author is acquired (step S1502). Speech recognition processing is then executed by using the speech recognition grammar acquired in step S1501 (step S1503).

Figure 16B:
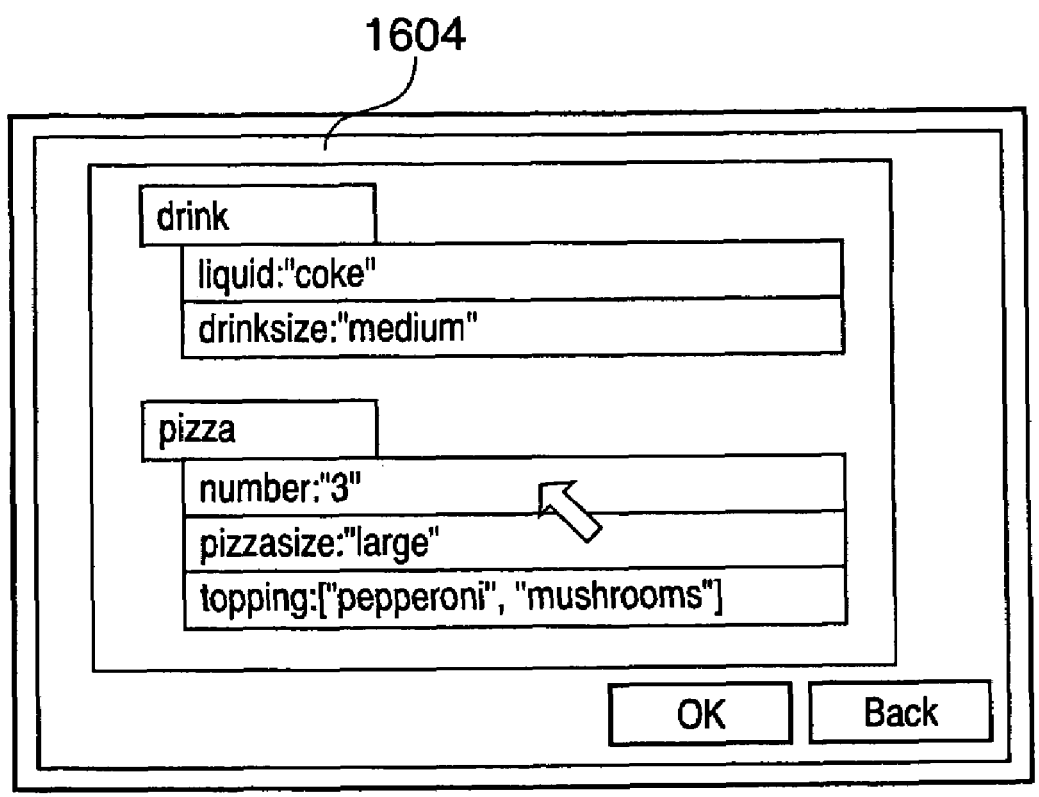
FIG. 16B is a view showing an example of a semantic structural path designating dialog in alternative embodiment 3.

When the speech recognition is complete, a semantic structure is generated from the speech recognition result (step S1504). This semantic structure is presented to the author (step S1505). In this case, for example, a semantic structural path designating dialog 1604 shown in FIG. 16B is displayed. As shown in FIG. 16B, the semantic structure of the utterance content from the author is presented, together with a value (number: "3" or the like). The author selects a specific semantic structural element from this window by using the input device 105. If, for example, the author wants to designate the number of pizzas, he/she clicks the portion "number" below "pizza". When a specific semantic structural element is designated, the corresponding information is acquired into the apparatus (step S1506).

The acquired information is compared with the semantic structure generated in step S1504 to generate a corresponding semantic structural path. For example, the character string "/pizza/number" is generated. This character string is then incorporated in the UI contents which are being generated (step S1507).

In the above example, a semantic structure is generated by an utterance from the author. However, a semantic structure can be generated from text data input by the author. For example, an utterance example text input form 1602 in FIG. 16A is prepared. When the author inputs an utterance content in this form by text and presses a predetermined decision button (e.g., "Next button" in FIG. 16A), a semantic structure can be generated from the text and speech recognition grammar.

Alternative Embodiment 4

It suffices to let an author take charge of inputting a semantic structural path and limit the function of a UI design apparatus to checking the path.

Figure 8:
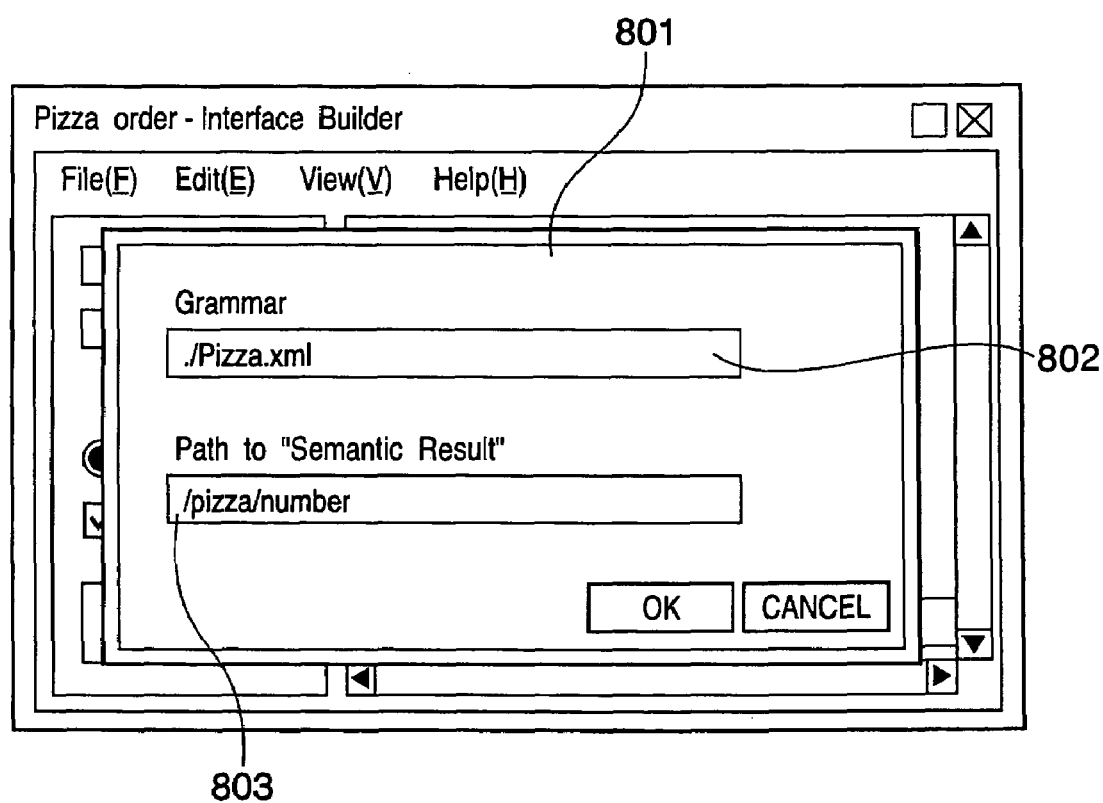
FIG. 8 is a view showing an example of a GUI which designates a semantic structure by a conventional UI authoring tool.

If, for example, the "semantic structure designating mode" is activated, a semantic structure bind dialog 801 shown in FIG. 8 is displayed to make the author designate a semantic structural path in a field 803 by text. Thereafter, the speech recognition grammar designated in a field 802 is analyzed. It is then checked whether semantic structures which can be generated by the grammar include any semantic structure matching the semantic structural path designated by the author. If any of the semantic structures which can be generated by the grammar does not match the semantic structural path designated by the author, it is determined that an author's input error has occurred, and error information is output.

Other Embodiments

The above embodiments have been described on the assumption that SRGS is used as a speech recognition grammar, and SISR is used as a semantic structure generating rule. However, the present invention can also be applied to other speech recognition grammar forms. In addition, contents to be output from the UI design apparatus may have their own specifications or existing language specifications (e.g., SALT, VoiceXML, and XHTML+Voice) can be used. Furthermore, either a format described in the text format or a format described in the binary format can be used.

Although the above embodiments are based on speech recognition, the present invention is not limited to speech recognition, and can also be applied to other pattern recognitions (e.g., handwritten character recognition and gesture recognition) using recognition grammars.

For example, in handwritten character recognition as well, a handwritten character input result accepted by a recognition grammar can be generated from only the recognition grammar. Using this makes it possible to present semantic structures which can be generated as described in alternative embodiment 1 to the author.

Figure 17A:
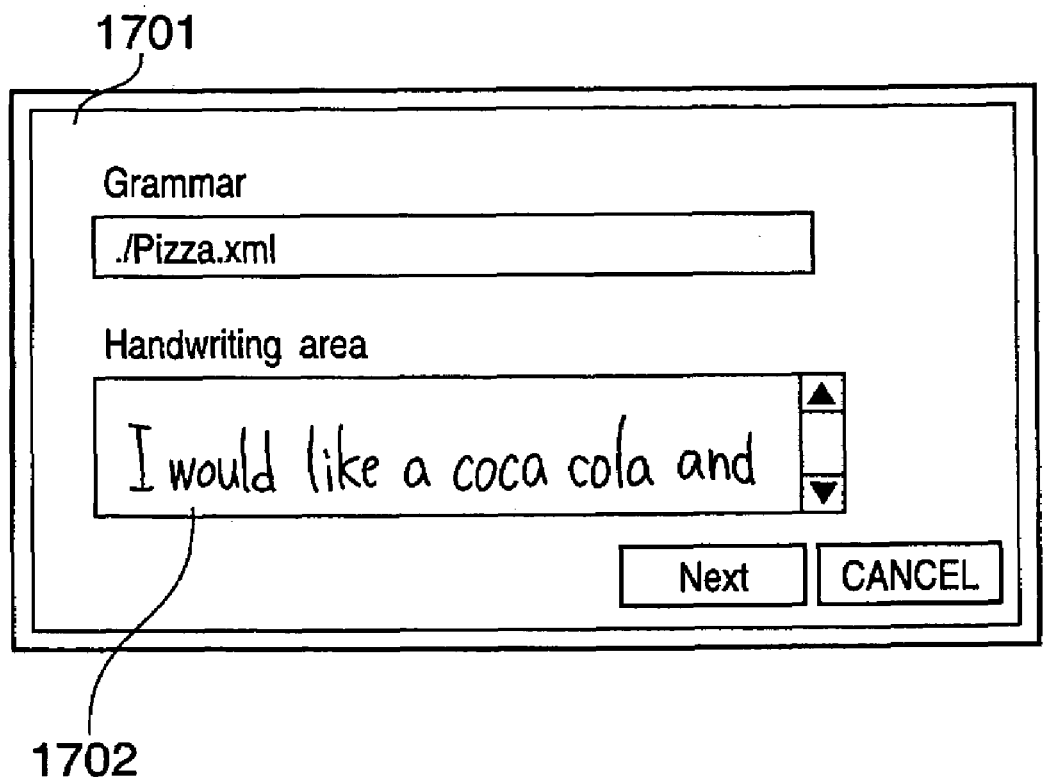
FIGS. 17A and 17B are views each showing an example of a GUI provided in a handwritten character recognition application in other embodiments.
Figure 17B:
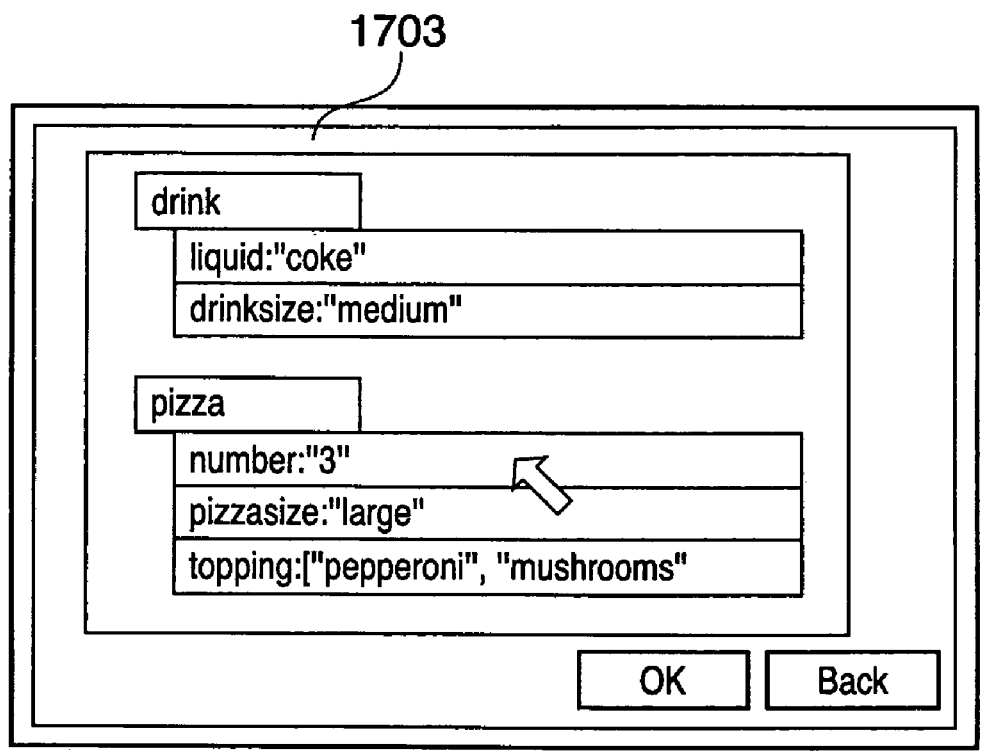

In addition, as in alternative embodiment 3, the author can be made to input an input example. FIGS. 17A and 17B each show an example of a GUI provided in a handwritten character recognition application. An application having this GUI operates in the same manner as in alternative embodiment 3. In alternative embodiment 3, however, speech input operation or text input operation using the keyboard is used as input operation by the author. In this case, the author inputs characters in a handwritten character input form 1702 in FIG. 17A by handwriting.

The UI design apparatus performs handwritten character recognition by using the grammar designated by a handwritten character recognition grammar designation form 1701 (FIG. 17A) and the data of handwritten characters input in a handwritten character input form 1702. The semantic structure generated from this result is presented to the author through a semantic structural path designating dialog 1703 in FIG. 17B, and path information to a specific semantic structural element is acquired from mouse operation by the author with respect to the structure.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-342898 filed Nov. 26, 2004, which is hereby incorporated by reference herein.

What is claimed is:

1. A user interface design apparatus for generating a user interface content of an application which provides a pattern recognition function, comprising:

acquiring means for acquiring a recognition grammar including a semantic structure generating rule for generating a semantic structure of the pattern recognition result;

extraction means for extracting at least one semantic structure from the semantic structure generating rule included in the recognition grammar acquired by said acquiring means;

display means for displaying semantic structural elements constituting the semantic structure extracted by said extraction means; and selection means for selecting at least one semantic structural element from the semantic structural elements displayed by said display means.

2. The apparatus according to claim 1, further comprising:
generating means for generating a semantic structural path based on the semantic structural element selected by said selection means; and
reflecting means for reflecting the semantic structural path generated by said generating means in the user interface content.

3. The apparatus according to claim 1, further comprising input information generating means for generating input information which can be accepted in accordance with the recognition grammar acquired by said acquiring means,
wherein said extraction means extracts a semantic structure when the input information generated by the input information generating information is input.

4. The apparatus according to claim 1, further comprising input example sentence extraction means for extracting an input example sentence described in the recognition grammar acquired by said acquiring means,
wherein said extraction means extracts a semantic structure when the input example sentence extracted by said input example sentence extraction means is input.

5. The apparatus according to claim 1, further comprising author input acquiring means for acquiring a pattern recognition input from an author,
wherein said extraction means extracts a semantic structure of a pattern recognition result with respect to the pattern recognition input acquired by said author input acquiring means.

6. The apparatus according to claim 1, wherein the pattern recognition is speech recognition, and the recognition grammar is a speech recognition grammar.

7. The apparatus according to claim 1, wherein the pattern recognition is handwritten character recognition and the recognition grammar is a handwritten character recognition grammar.

8. The apparatus according to claim 6, wherein the speech recognition grammar is described in compliance with a specification of Speech Recognition Grammar Specification recommended by W3C, and the semantic structure generating rule is described in compliance with a specification of Semantic Interpretation for Speech Recognition recommended by W3C.

9. A user interface design apparatus for generating a user interface content of an application which provides a pattern recognition function, comprising:
first acquiring means for acquiring a recognition grammar including a semantic structure generating rule for generating a semantic structure of the pattern recognition result;
second acquiring means for acquiring a semantic structural path input by an author;
confirming means for confirming whether semantic structures which can be generated in accordance with the recognition grammar include a semantic structure which matches the semantic structural path; and
output means for outputting error information when confirmation cannot be obtained by said confirming means.

10. A method for generating a user interface content of an application which provides a pattern recognition function, comprising the steps of:
acquiring a recognition grammar including a semantic structure generating rule for generating a semantic structure of the pattern recognition result;
extracting at least one semantic structure from the semantic structure generating rule included in the acquired recognition grammar;
displaying semantic structural elements constituting the extracted semantic structure on a display unit; and
selecting at least one semantic structural element from the displayed semantic structural elements.

11. A method for generating a user interface content of an application which provides a pattern recognition function, comprising the steps of:
acquiring a recognition grammar including a semantic structure generating rule for generating a semantic structure of the pattern recognition result;
acquiring a semantic structural path input by an author;
confirming whether semantic structures which can be generated in accordance with the recognition grammar include a semantic structure which matches the semantic structural path; and
outputting error information when the confirmation cannot be obtained.

12. A computer readable medium storing a program for causing a computer to function as a user interface design apparatus for generating a user interface content of an application which provides a pattern recognition function, comprising the code for the steps of:
acquiring a recognition grammar including a semantic structure generating rule for generating a semantic structure of the pattern recognition result;
extracting at least one semantic structure from the semantic structure generating rule included in the acquired recognition grammar;
displaying semantic structural elements constituting the extracted semantic structure on a display unit; and
selecting at least one semantic structural element from the displayed semantic structural elements.

13. A computer readable medium storing a program for causing a computer to function as a user interface design apparatus for generating a user interface content of an application which provides a pattern recognition function, comprising the code for the steps of:
acquiring a recognition grammar including a semantic structure generating rule for generating a semantic structure of the pattern recognition result;
acquiring a semantic structural path input by an author;
confirming whether semantic structures which can be generated in accordance with the recognition grammar include a semantic structure which matches the semantic structural path; and
outputting error information when the confirmation cannot be obtained.

* * * * *